United States Patent
Yaqub et al.

(10) Patent No.: US 12,526,296 B1
(45) Date of Patent: Jan. 13, 2026

(54) CYBERATTACK DETECTION AND PROTECTION SYSTEM FOR A DISTRIBUTED CONTROL SYSTEM

(71) Applicant: Alabama A&M University, Normal, AL (US)

(72) Inventors: Raziq Yaqub, Normal, AL (US); Dennis Culley, Cleveland, OH (US)

(73) Assignee: Alabama A&M University, Normal, AL (US)

( * ) Notice: Subject to any disclaimer, the term of this patent is extended or adjusted under 35 U.S.C. 154(b) by 416 days.

(21) Appl. No.: 17/667,208

(22) Filed: Feb. 8, 2022

Related U.S. Application Data (60) Provisional application No. 63/146,976, filed on Feb. 8, 2021.

(51) Int. Cl.
| | |
|---|---|
| *H04L 9/00* | (2022.01) |
| *H04L 9/08* | (2006.01) |
| *H04L 9/40* | (2022.01) |

(52) U.S. Cl.
CPC ........ *H04L 63/1425* (2013.01); *H04L 9/0891* (2013.01); *H04L 63/1441* (2013.01)

(58) Field of Classification Search
CPC ............... H04L 63/1425; H04L 9/0891; H04L 63/1441
See application file for complete search history.

(56) References Cited

U.S. PATENT DOCUMENTS

| | | | | |
|---|---|---|---|---|
| 11,068,593 | B2 * | 7/2021 | Shabtai | G08G 5/003 |
| 11,558,401 | B1 * | 1/2023 | Vashisht | H04L 63/1416 |
| 2014/0075506 | A1 * | 3/2014 | Davis | H04B 7/18508 |
| | | | | 726/3 |
| 2017/0041331 | A1 * | 2/2017 | Craig | H04L 63/1441 |
| 2017/0134400 | A1 * | 5/2017 | Nguyen | H04L 63/1416 |
| 2019/0033862 | A1 * | 1/2019 | Groden | G08G 5/0086 |
| 2021/0320928 | A1 * | 10/2021 | Stuck | H04L 63/1441 |

FOREIGN PATENT DOCUMENTS

| | | | | |
|---|---|---|---|---|
| WO | WO-2019227076 | A1 * | 11/2019 | H04L 12/40013 |

\* cited by examiner

*Primary Examiner* — Kevin Ayala
(74) *Attorney, Agent, or Firm* — Brian T. Sattizahn; Maynard Nexsen PC

(57) ABSTRACT

A cyberattack detection and protection system is able to detect an anomalous condition in a distributed control system of an aerospace vehicle in real time by analyzing the packets from redundant channels used by each device in the control system. The cyberattack detection and protection system initially performs a shallow packet inspection of values in the packets from the redundant channels. If there is an inconsistency in the values from the packets, the cyberattack detection and protection system can perform a deep packet inspection on the packet from the primary channel to determine the specific anomalous condition. If an anomalous condition is detected, the cyberattack detection and protection system can switch operation from the primary channel to the redundant channel to mitigate the anomalous condition.

22 Claims, 9 Drawing Sheets

FIG. 13

CYBERATTACK DETECTION AND PROTECTION SYSTEM FOR A DISTRIBUTED CONTROL SYSTEM

CROSS-REFERENCE TO RELATED APPLICATIONS

This application claims the benefit of U.S. Provisional Patent Application No. 63/146,976, entitled "INTELLIGENT SYSTEM FOR CYBERATTACK DETECTION AND PROTECTION FOR DISTRIBUTED CONTROL SYSTEMS IN AIR VEHICLES" and filed on Feb. 8, 2021, which application is incorporated herein by reference.

STATEMENT REGARDING FEDERALLY SPONSORED RESEARCH OR DEVELOPMENT

This invention was made with Government support by the National Aeronautics and Space Administration. The Government has certain rights in the invention.

BACKGROUND

The present application generally relates to a cyberattack detection and protection system for a distributed control system, such as a distributed control system for an aerospace vehicle.

An aerospace vehicle can incorporate distributed control systems to monitor and control the physical systems and processes of the aerospace vehicle during operation of the aerospace vehicle. For example, the distributed control system for an aerospace vehicle can have control systems associated with flight control, landing gear, hydraulic and/or electrical systems, fuel management, engine operation, climate control, etc. Each control system can use one or more controllers that directly interface with the components (e.g., sensors and actuators) of the physical system that are used for monitoring and controlling the process variables of the corresponding physical process. The controllers can then communicate with a "main" computer or controller having a user interface that permits an operator to monitor and control the entire physical system and corresponding processes via interactions with individual controllers.

Due to the higher profile of aerospace vehicles, an aerospace vehicle may be the subject of a cyberattack attempting to disable or disrupt operation of one or more of the control systems of the aerospace vehicle for political or monetary gain. A cyberattack on an aerospace vehicle can occur from a hacker or "bad actor" pushing a malicious payload (e.g., data, code, etc.) to the aerospace vehicle through a communication link to cause a denial of service (DOS), SQL Injection, distributed denial of service (DDOS), and/or Man-in-the-Middle attack. Some examples of possible ways a hacker can access the systems of an aerospace vehicle are: (i) from ground to air, (ii) through onboard access points, including passenger entertainment systems, (iii) wirelessly through devices in the cargo area of the aerospace vehicle, or (iv) by compromising the maintenance crew on the ground to gain access to the aerospace vehicle. Due to the potential for catastrophic consequences if one or more of the control systems of the aerospace vehicle are compromised, it would be beneficial to have a system to detect and protect against cyberattacks on control systems of an aerospace vehicle.

BRIEF DESCRIPTION OF THE DRAWINGS

Wherever possible, the same reference numbers are used throughout the drawings to refer to the same or like parts.

DETAILED DESCRIPTION

The present application generally pertains to an intelligent cyberattack detection and protection system for the real time detection and protection of distributed control systems in aerospace vehicles. The intelligent cyberattack detection and protection system is able to detect cybersecurity events or attacks at the aerospace vehicle that are launched remotely from the ground, from inside the aircraft, from compromised maintenance actions or from supply chains. Once the cybersecurity event is detected, the intelligent cyberattack detection and protection system can take remedial actions to limit the impact of an event or attack.

The intelligent cyberattack detection and protection system can be incorporated into the control systems of the aerospace vehicle. Specifically, each control system can have one or more controllers that are connected to a plurality of devices (e.g., sensors and actuators) by redundant communication channels (e.g., primary and secondary communication channels). The controller and corresponding devices of a particular control system can be used to monitor and control a specific physical system or process (or a portion thereof) associated with the aerospace vehicle. The process logic of the controller can receive information (e.g., sensor readings) from certain devices (e.g., sensors) and generate commands (e.g., actuator instructions) for other devices (e.g., actuators) based on the received information. The process logic of the controller typically communicates with the devices via the primary communication channel.

The intelligent cyberattack detection and protection system can be incorporated into each controller in a control system. The intelligent cyberattack detection and protection system in the controller can receive information from the devices on both the primary and secondary communication channels and can use this information to determine an anomalous condition (e.g., a cybersecurity event is occurring, if a false positive has been received or if a fault condition (or possible fault condition) has occurred) at the device. In an embodiment, the intelligent cyberattack detection and protection system can compare the data in packets received from both the primary and secondary channels of the device for a common event. If the comparison of the data is outside of a predetermined threshold range, then the intelligent cyberattack detection and protection system identifies an inconsistency and proceeds to determine a reason for the inconsistency (e.g., a cybersecurity event, a false positive or fault condition has occurred). After identifying the inconsistency, the intelligent cyberattack detection and protection system can scan the header and payload of each packet for known attack signatures and/or addresses. If a known attack signature or address is identified in a packet, the intelligent cyberattack detection and protection system can indicate that the inconsistency occurred because a cybersecurity event is occurring and take remediation actions.

One remediation action that can be taken is the use of an alternate communication channel between a controller and a device when the current communication channel between the controller and the device has become corrupted or unreliable from the cybersecurity event or false positive. For each device connected to the controller, the redundant communication channels (e.g., primary and secondary communication channels) can have different IP addresses and communicate using unique encryption keys thereby enabling the secondary communication channel to be used (which may not be subject to an attack) if the encryption code is broken or the IP address is compromised in the primary communication channel.

The words "data" and "packet" when used in the application are not referring to any specific technology or format but are used in a general sense. The words "data" and "packet" can be understood in the context of IETF based IP protocols, IEEE 802.3 based Ethernet protocols, auto industry based CAN/LIN Bus protocols, or any other distributed control system based protocols, such as SCADA, Modbus etc.

Figure 1:
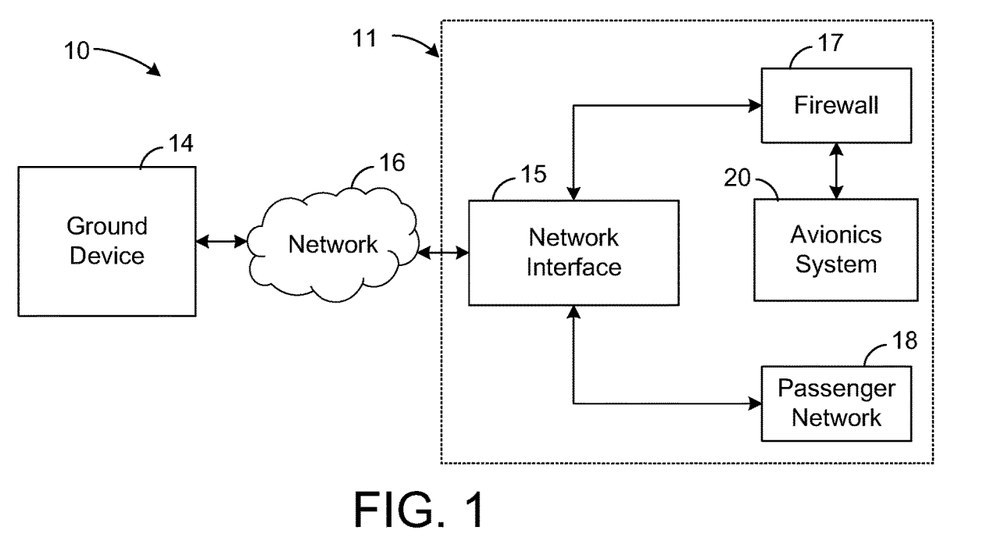
FIG. 1 is a block diagram showing an embodiment of an aerospace system.

FIG. 1 shows an embodiment of an aerospace system 10. The system 10 provides for communication between an aerospace vehicle 11 and a ground device 14 via a network 16. In one embodiment the aerospace vehicle 11 can be an aircraft or spacecraft. The aircraft 11 can include an avionics system 20 that can be used to control the systems of the aircraft 11. The avionics system 20 can be communicatively coupled to the network 16 by a network interface 15 (e.g., a router or other similar communication device) such that the avionics system 20 can exchange, i.e., send and receive, instructions, data and/or information with the ground device 14. In one embodiment, the ground device 14 can be an airport control tower, a server computer for the operator of the aircraft 11 or other similar type of computer or control system. A firewall 17 can be coupled between the network interface 15 and the avionics system 20 to limit undesirable traffic on the network 16 from reaching the avionics system 20. A passenger network 18 (e.g., a passenger entertainment system and/or a Wi-Fi network) can also be coupled to the network interface 15 and be used to provide broadband services to the passengers of the aircraft 11. In other embodiments, the avionics system 20 and firewall 17 may be coupled directly to network 16 without using a network interface 15. In an embodiment, the network 16 can be the Internet and use the transmission control protocol/Internet protocol (TCP/IP) to communicate over the network 16.

Figure 2:
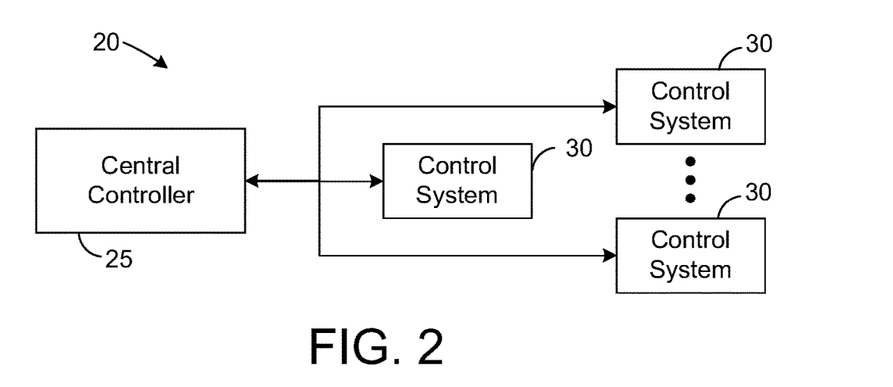
FIG. 2 is a block diagram showing an embodiment of the avionics system from the aerospace system of FIG. 1.

FIG. 2 shows an embodiment of the avionics system 20. As shown by FIG. 2, the avionics system 20 includes a central controller 25 that can be used to monitor and control multiple aircraft control systems 30. In one embodiment, the central controller 25 can be connected to the aircraft control systems 30 by a suitable network. One or more of the control systems 30 can be supervisory control and data acquisition (SCADA) systems that can be used to control physical systems and/or processes of the aircraft 11 in some embodiments. For simplicity of illustration, FIG. 2 depicts three control systems 30 and one central controller 25, but there can be any number of control systems 30 or central controllers 25 in other embodiments.

Figure 3:
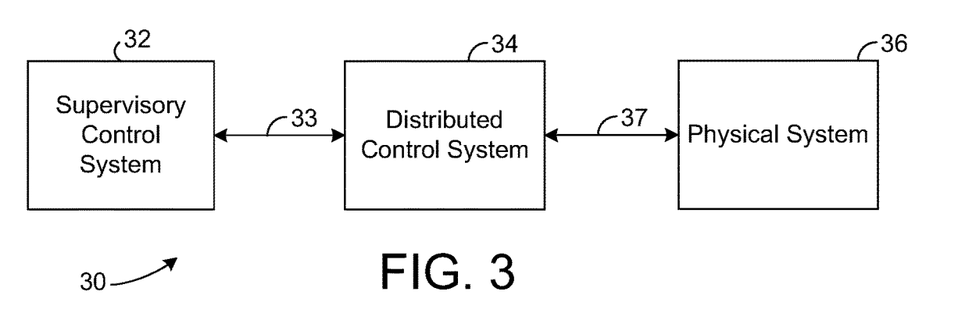
FIG. 3 is a block diagram showing an embodiment of a control system from the avionics system of FIG. 2.
Figure 4:
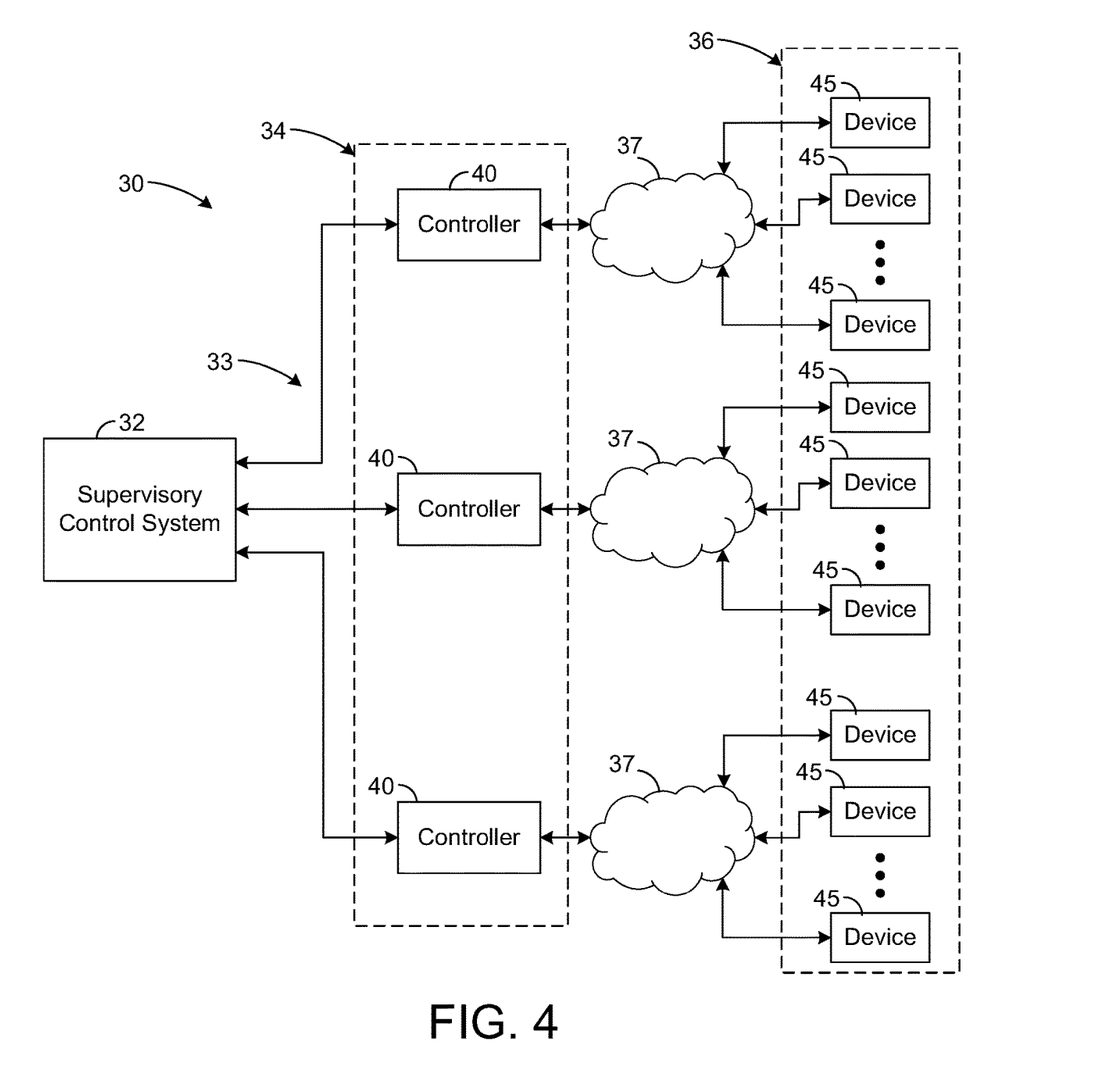
FIG. 4 is a block diagram showing an embodiment of the specific components of the control system of FIG. 3.

FIGS. 3 and 4 show embodiments of the control system 30. In one embodiment, the control system 30 can include a supervisory control system 32 that is connected to a distributed control system 34 by a network 33. The distributed control system 34 can be connected to the physical system 36 by one or more cyber-physical links 37. In an embodiment, the supervisory control system 32 can include a human-machine interface (HMI) and the network 33 can utilize a suitable SCADA protocol (e.g., Modbus or Profibus) for communications. The distributed control system 34 can include multiple controllers 40 (see FIG. 4), which can be programmable logic controllers (PLCs) in one embodiment. The distributed control system 34 can be connected to multiple devices 45 (see FIG. 4) in the physical system 36. For simplicity of illustration, FIG. 4 depicts one supervisory control system 32, three controllers 40 and nine devices 45, but there can be any number of supervisory control systems 32, controllers 40 or devices 45 in other embodiments.

The HMI of the supervisory control system 32 can be a front-end interface by which operators of the aircraft 11 can interact with the monitored variables of the control system 30. The HMI of the supervisory control system 32 can include a display (or screen) that presents a graphical user interface to the operator. The graphical user interface can provide one or more buttons, alarms, reports or trends that can be used for monitoring, analyzing and controlling the processes of the control system 30. In an embodiment, the HMI of the supervisory control system 32 can be located in the cockpit of the aircraft 11. The HMI of the supervisory control system 32 can use the network 33 to communicate with the controllers 40 of the distributed control system 34 to gather information about the process variables and display them on the screen. In addition, the HMI of the supervisory control system 32 can use network 33 to send control actions and other types of messages to the devices 45 (see FIG. 4) via the controllers 40.

The distributed control system 34 can include one or more controllers 40 that can directly interface with the devices 45 (e.g., sensors and actuators) of the physical system 36 through the cyber-physical link 37 as shown in FIG. 4. The controllers 40 can have embedded control capabilities in order to accomplish some logic operations. In an embodiment, the controllers 40 can be programmable logic controllers (PLCs). The controllers 40 can be responsible for collecting signals from some of the devices (e.g., sensors) 45 through the cyber-physical link 37, processing the received signals from the sensors according to pre-defined programming, and then sending response signals to other devices (e.g., actuators) 45, also through the cyber-physical link 37. In an embodiment, the cyber-physical link 37 can provide for redundant channels of communication between each device 45 and the controller 40 (e.g., a primary channel and a secondary channel). The redundant channels in the cyber-physical link 37 can already be present from the design of the control system 30 (e.g., redundant channels/systems are typically utilized in aircraft 11) or redundant channels can be added to select channels where the redundant channel can be added with a minimum penalty via virtual techniques.

The cyber-physical link 37 provides a transport medium with redundant channels for signals to be communicated between the physical system 36 and the distributed control system 34. In an embodiment, the cyber-physical link 37 can utilize one or more of Fieldbus, Highway Addressable Remote Transducer (HART), Zigbee or any other suitable protocol to communicate signals and information between the physical system 36 and the distributed control system 34. In other embodiments, the cyber-physical link 37 may just incorporate plain electrical wires that directly transport voltage or current signals.

The physical system 36 can have devices 45 used to implement one or more physical systems or processes associated with the aircraft 11. The devices 35 (e.g., sensors and/or actuators) can be used to monitor and control process variables associated with the physical processes. A sensor can be a device that measures a physical quantity (e.g., pressure, temperature, flow, density, etc.) and converts the measurement into an electric signal which can be read by an observer (via the HMI of the supervisory control system 32) or by an instrument. An actuator can be a component of a machine in the physical system 36 that is responsible for moving or controlling a mechanism in the physical system 36 in response to an input control signal from the distributed control system 34. In an embodiment, the actuator can be the mechanism by which the control system 30 can control the physical system or process of the aircraft.

Figure 5:
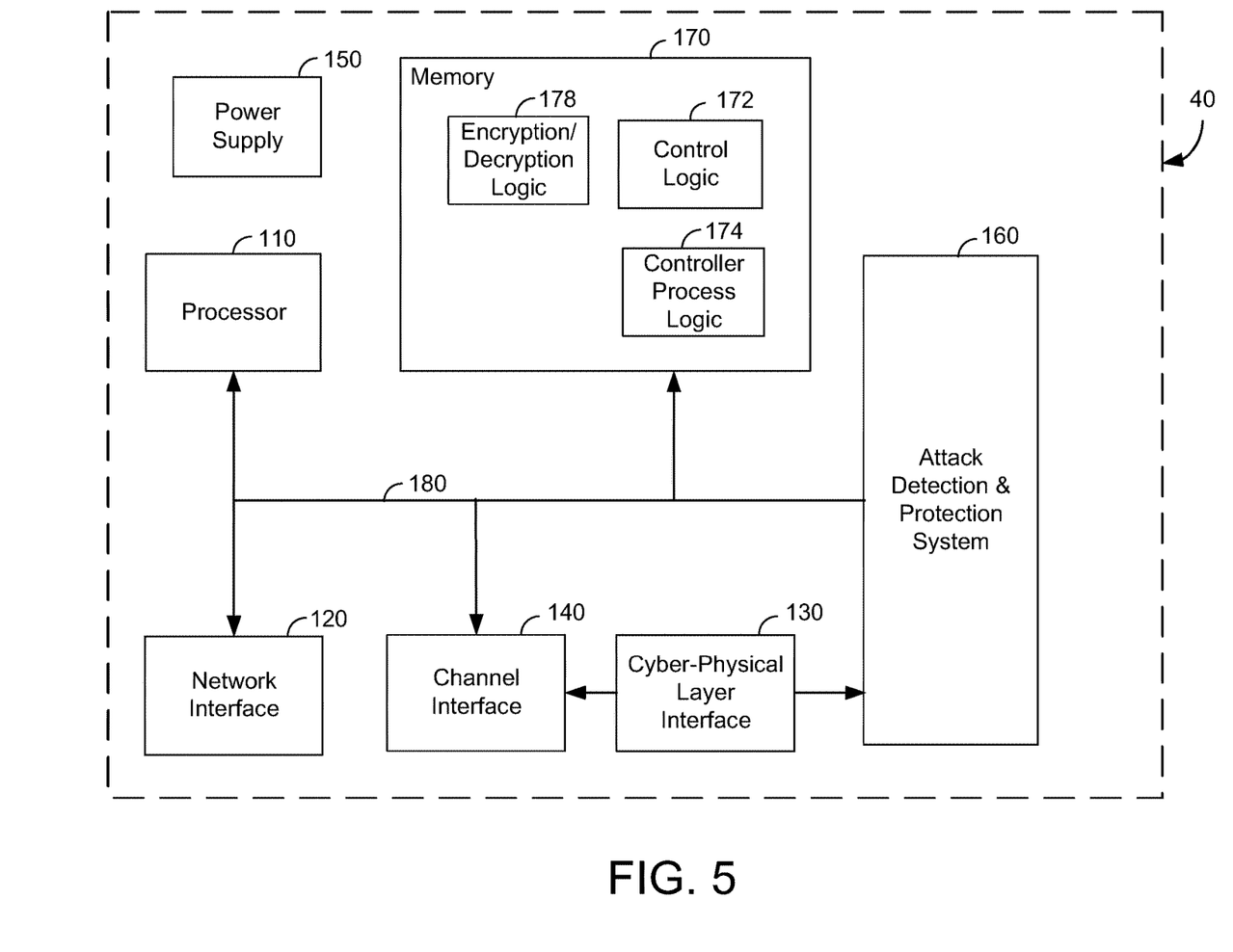
FIG. 5 is a block diagram of an embodiment of the controller of FIG. 4.

FIG. 5 shows an embodiment of the controller 40. The controller 40 shown by FIG. 5 can include logic 172, referred to herein as "control logic," for generally controlling the operation of the controller 40. The controller 30 also includes logic 174, referred to herein as "controller process logic," and logic 178, referred to herein as "encryption/decryption logic." The controller process logic 174 can incorporate pre-programmed and user-defined logic for receiving and processing information received from some devices 45 (e.g., sensors) and generating instructions or commands for other devices 45 (e.g., actuators) based on the received information. In addition, the controller process logic 174 can receive response from some devices 45 (e.g., actuators) indicating that received instructions or commands (from the controller process logic 174) have been completed. The encryption/decryption logic 178 can be used to decrypt information received from the devices 45 or encrypt information to be sent to the devices 45 using keys stored in memory 170. In an embodiment, the controller 40 receives encrypted data from the "primary channel" of each device 45 (e.g., a sensor) via the cyber-physical layer interface 130 and the channel interface 140. The encryption/decryption logic 178 can decrypt the data and provide it to the controller process logic 174, which can then control a corresponding device 45 (e.g., an actuator) accordingly using the primary channel for the device 45.

In other embodiments, the controller process logic 174 and/or the encryption/decryption logic 178 can be combined with the control logic 172 or with one another. The controller 40 can also include an attack detection and protection system 160 to determine when the controller 40 or the control system 30 may be under attack and, once the determination of an attack has been made, to take corrective actions to mitigate the attack. The control logic 172, the controller process logic 174, the encryption/decryption logic 178 and the attack detection and protection system 160 may be implemented in software, firmware, hardware, or any combination thereof. In FIG. 5, the control logic 172, the controller process logic 174, the encryption/decryption logic 178 and the attack detection and protection system 160 are implemented in software. The control logic 172, the controller process logic 174 and the encryption/decryption logic 178 may be stored in memory 170. However, other configurations of the control logic 172, the controller process logic 174, the encryption/decryption logic 178 and the attack detection and protection system 160 are possible in other embodiments.

Note that the control logic 172, the controller process logic 174, the encryption/decryption logic 178 and the attack detection and protection system 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The controller 40 may include at least one conventional processor 110, which includes processing hardware for executing instructions stored in the memory 170. As an example, the processor 110 may include a central processing unit (CPU) or a digital signal processor (DSP). The processor 110 communicates to and drives the other elements within the controller 40 via a local interface 180, which can include at least one bus. When the control logic 172, the controller process logic 174, the encryption/decryption logic 178 and the attack detection and protection system 160 are implemented in software, the processor 110 may execute instructions of the control logic 172, the controller process logic 174, the encryption/decryption logic 178 and the attack detection and protection system 160 to perform the functions ascribed herein to the control logic 172, the controller process logic 174, the encryption/decryption logic 178 and the attack detection and protection system 160.

The controller 40 can have numerous ports (not specifically shown) that can provide connections to communication interfaces for the controller 40 to communicate with other components of the control system 30. As shown in FIG. 5, the controller 40 can include a network interface 120 and a cyber-physical layer interface 130. While the network interface 120 and the cyber-physical layer interface 130 are shown as separate interfaces in FIG. 5, the interfaces may be combined into a single interface in other embodiments. The network interface 120 enables the controller 40 to communicate with the supervisory control system 32 and other nodes of the control system 30. The cyber-physical layer interface 130 enables the controller 40 to communicate with both channels (i.e., primary and secondary channels) associated with each of the devices 45.

The cyber-physical layer 130 is communicatively coupled to both a channel interface 140 and the attack detection and protection system 160. The communication between the channel interface 140 and the cyber-physical layer 130 includes only the packets associated with the "primary" channel of each device 45. The communication between the attack detection and protection system 160 and the cyber-physical layer 130 includes the packets associated with both the primary and secondary channels of each device 45. In an embodiment, the network interface 120 and the cyber-physical layer interface 130 may use separate IP ranges to permit the controller 40 to isolate each communication link provided by an interface. Each of the network interface 120 and the cyber-physical layer interface 130 may include corresponding equipment for wired (or wireless) communications. The controller 40 can also have a power supply 150, which provides electrical power to the components of the controller 40 and possibly, in an embodiment, to devices 45 via the cyber-physical layer interface 130.

Figure 6:
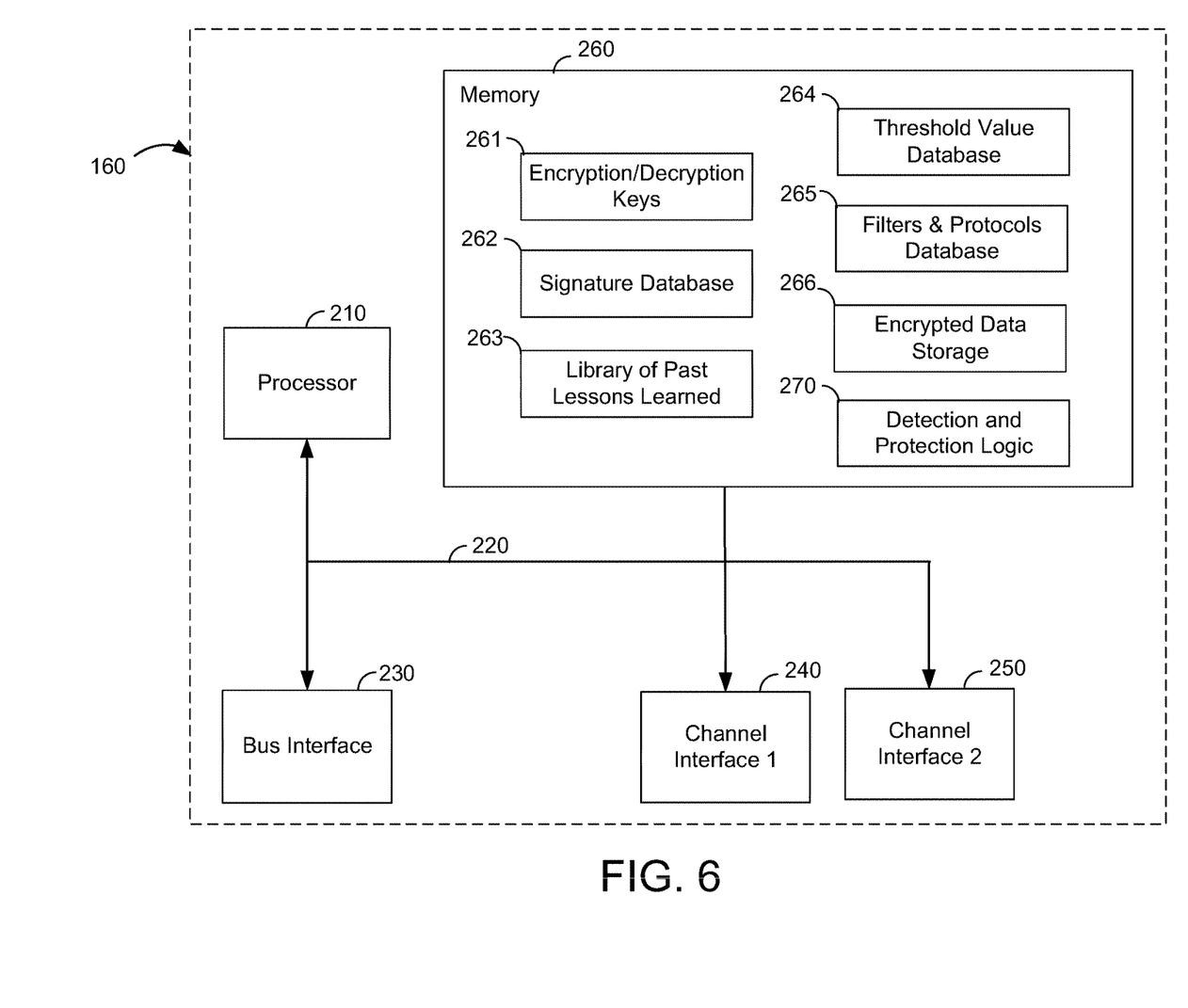
FIG. 6 is a block diagram of an embodiment of the attack detection and protection system of FIG. 5.

FIG. 6 shows an embodiment of the attack detection and protection system 160 within the controller 40. The attack detection and protection system 160 shown by FIG. 6 can include logic 270, referred to herein as "detection and protection logic," for generally controlling the attack detection and protection system 160, monitoring the operation of the devices 45 connected to the controller 40 and taking remedial actions to correct anomalous operations of the devices 45. The detection and protection logic 270 may be implemented in software, firmware, hardware, or any combination thereof. In FIG. 6, the detection and protection logic 270 is implemented in software. The detection and protection logic 270 can be stored in memory 260.

Note that the detection and protection logic 270, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The attack detection and protection system 160 may include at least one conventional processor 210, which includes processing hardware for executing instructions stored in the memory 260. As an example, the processor 210 may include a central processing unit (CPU) or a digital signal processor (DSP). In one embodiment, the processor 210 can be a Linux-based processor. In another embodiment, the processor 210 may correspond to processor 110 or a portion of processor 110 and memory 260 may be incorporated into memory 170. In other embodiments, the processor 210 may be separate from processor 110 and memory 260 may be separate from memory 170. The processor 210 communicates to and drives the other elements within the attack detection and protection system 160 via a local interface 220, which can include at least one bus. When the detection and protection logic 270 is implemented in software, the processor 210 may execute instructions of the detection and protection logic 270 to perform the functions ascribed herein to the detection and protection logic 270.

As shown in FIG. 6, the attack detection and protection system 160 can include a bus interface 230, a first channel interface 240 and a second channel interface 250. The bus interface 230 enables the attack detection and protection system 160 to communicate with the processor 110 and the controller process logic 174 of the controller 40. The first channel interface 240 and a second channel interface 250 enables the attack detection and protection system 160 to communicate with both channels (i.e., primary and secondary channels) associated with each of the devices 45 via the cyber-physical layer interface 130 of the controller 40. In an embodiment, the attack detection and protection system 160 can use encrypted communications when communicating via the bus interface 230, the first channel interface 240 and the second channel interface 250. In another embodiment, the attack detection and protection system 160 may include one or more firewalls (not shown) for communications over the bus interface 230, the first channel interface 240 and the second channel interface 250.

In another embodiment, the attack detection and protection system 160 may include a separate communication interface for encrypted communication with different entities, such as peer attack detection and protection systems 160 located in other controllers 40 and higher level systems such as the supervisory control system 32. The attack detection and protection system 160 may also choose to send data or reports to a ground device 14 (e.g., a control tower) depending on the situation or the severity of the attack through the supervisory control system 32 and the central controller 25.

In addition, the memory 260 of the attack detection and protection system 160 can store encryption/decryption keys 261, a signature database 262, a library of past lessons learned 263, a threshold value database 264, a filters and protocols database 265 and encrypted data storage 266. The encryption/decryption keys 261 can be used to encrypt and decrypt all of the incoming and outgoing messages (e.g., packets communicated via the first channel interface 240 and the second channel interface 250) to the attack detection and protection system 160

The signature database 262 can include the fingerprints and/or signatures of all of the known malware codes, viruses bit patterns, attacks codes, etc. and the set of rules or processes that can be used to detect anomalies and attacks based on the fingerprints and/or signatures. In an embodiment, the signature database 262 can be updated with the latest released fingerprints and signatures by authorized personnel or, automatically, via OTAP (over the air provisioning). The signature database 262 can either be completely updated such that the entire collection of known signatures and/or fingerprints can be loaded into the signature database 262 or incrementally updated such that only new or changed signatures and/or fingerprints can loaded into the signature database 262.

The library of past lessons learned 263 can be a curated collection of information. The collection of information can include the logs that the detection and protection logic 270 prepares to record symptoms and the nature of the fault/attack/false positive, the remedial measures applied against the fault/attack/false positive and the outcomes of the remedial measures (i.e., which measures were successful and which measures were unsuccessful). Thus, the library of past lessons learned 263 can include past lessons learned and become a reference for a self-learning machine (i.e., one or machine learning algorithms) to learn over time and making more informed decisions if such a condition (or set of symptoms of a fault/attack/false positive) occurs again in future. In an embodiment, the self-learning machine can be incorporated into the detection and protection logic 270 or as a separate module in memory 260 used by the detection and protection logic 270. As the knowledge base for the self-learning machine increases, the self-learning machine may be able to identify previously unknown types of attacks, including zero day attacks. In an embodiment, the detection and protection logic 270 may also send the logs (or report) provided to the library of past lessons learned 263 to the ground device 14 (e.g., a control tower) depending on the situation, or severity of the attack.

The threshold value database 264 can include a range of values for safe operation of each of the devices 45 (e.g., sensors and actuators) and corresponding equipment associated with the devices 45 for the control system 30. The threshold value database 264 can be specifically customized to each individual device 45 (e.g., sensor or actuator) in a specific aerospace vehicle 11. The threshold value database 264 can be continuously updated to adopt new and/or revised threshold values for the devices 45 that account for the level of degradation in the performance of the device 45 (or corresponding equipment) over time due to erosion, corrosion, thermal expansion and/or other environmental effects. In an embodiment, the threshold values can be automatically revised based on number of flying hours and/or cycles of operation for the aircraft 11. The relationship between the cycles of operation of the aircraft 11 and performance degradation of devices 45 (or corresponding equipment) can be automatically computed by the detection and protection logic 270 to determine the new threshold values. In an embodiment, the detection and protection logic 270 can construct a degradation model based on the manufacturer's datasheet and performance/maintenance charts, sensor characteristics and a failure zone specified by the manufacturer. In another embodiment, the threshold values can be further refined over a period of time using the library of past lessons learned 263.

The filters and protocols database 265 can include security filters, file and application formats, and standard protocols. The filters and protocols database 265 defines the format and structure of different protocols and their layers. The filters and protocols database 265 can filter and distinguish the files, the protocols, applications, formats, etc. in the packets received by the detection and protection logic 270. The filters and protocols database 265 can also be used to reconstruct a message from the received packets. The protocols in the packets can be related to communications and distributed controls. The filters and protocols database 265 also defines the security levels for applications, users, and groups. The filters in the filters and protocols database 265 enable users to control access to the attack detection and protection system 160 and the individual data within the memory 260 by defining what kind of access is allowed to which parts of memory 260, and to whom the access settings apply. The filters and protocols database 265 stores the policies related to access control and also keeps the log of system users and administrators who accessed memory 260 and what part of the memory 260.

The encrypted data storage 266 can be used to save, in real time, every packet from the first channel interface 240 and the second channel interface 250 received by the attack detection and protection system 160 as encrypted data. In an embodiment, the detection and protection logic 270 can be used to encrypt the received packets using encryption/decryption keys 261. The packets saved in the encrypted data storage 266 can also be saved with timestamp, GPS coordinates (of the aircraft 11), and altitude (of the aircraft 11) information. In addition, the detection and protection logic 270 can also prepare index/metadata information for each packet and save the index/metadata information with the packet. The inclusion of the index/metadata information makes the records searchable using different key parameters such as altitude, geographical location, timestamp, destination address, source address, port number, application, file format, and any other parameter that can be used to facilitate a forensic analysis of the information. In other embodiments, the encrypted data storage 266 may be additionally or alternatively stored in a remote location from the aircraft (e.g., cloud storage). In still another embodiment, data in the encrypted data storage 266 may be uploaded and stored in the remote storage location after preselected period of time has elapsed to permit longer term storage and/or archiving of the data. Both the stored packet information and the corresponding metadata information can be used for forensic analysis, quickly filtering of the information, accessing a specific piece of information, or preparing reports at a later time, if needed. In an embodiment, the encrypted data storage 266 can be stored for a period of time as specified by a corresponding security policy of a government entity (e.g., the Federal Aviation Administration or Department of Homeland Security).

Figures 7, 8, 9:
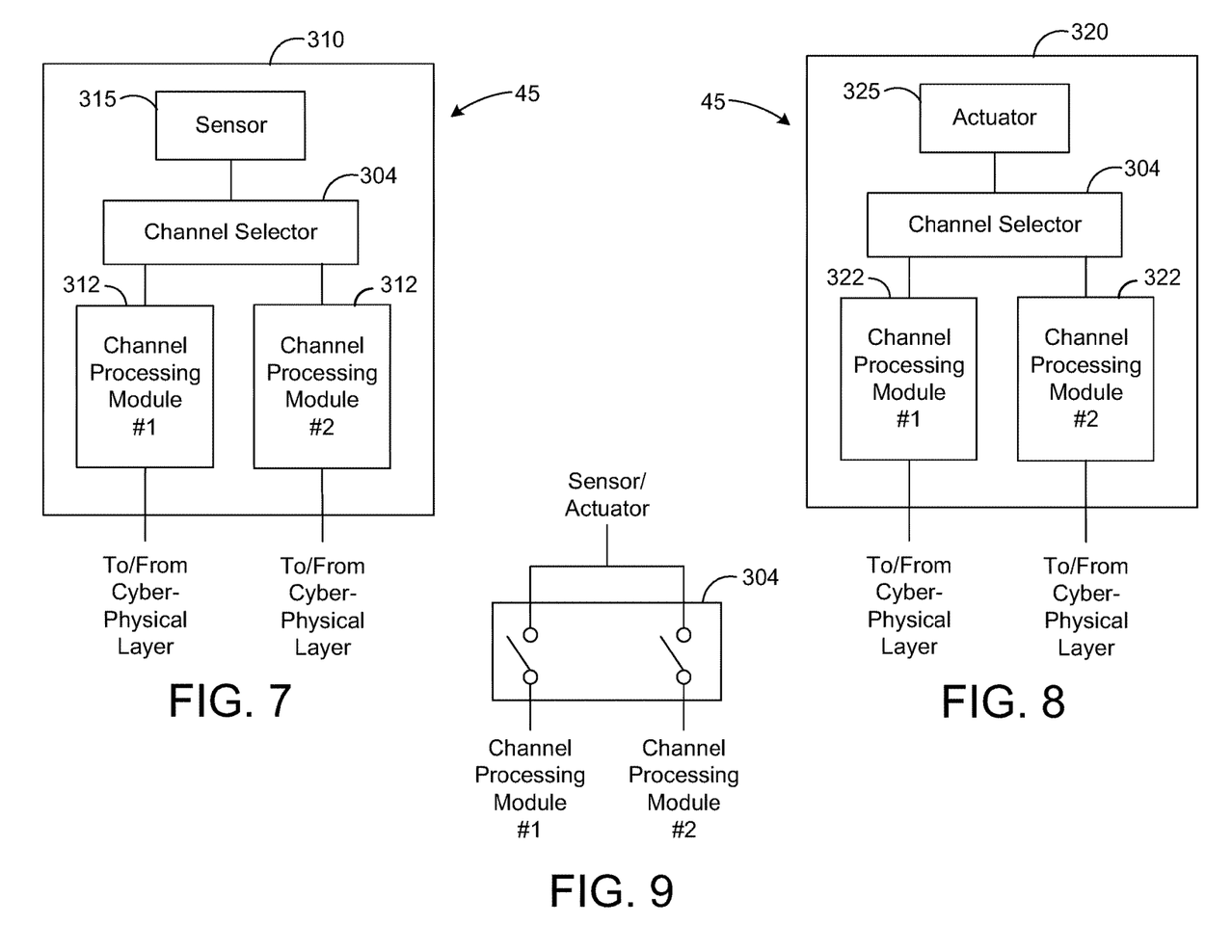
FIGS. 7 and 8 are block diagrams of embodiments of the devices of FIG. 4.
FIG. 9 schematically shows an embodiment of the channel selector of FIGS. 7 and 8.

The devices 45 can include smart sensor nodes 310 and smart actuator nodes 320. As shown in FIG. 7, the smart sensor node 310 can include a sensor 315 to measure a corresponding parameter of the physical system or process. The output reading (or measurement) from the sensor 315 can be provided to one or more of the redundant channel processing modules 312 by a channel selector 304. The first channel processing module 312 and the second channel processing module 312 can use different IP addresses and/or different encryption keys when communicating with the controller 40 such that the channels are independent of one another. In one embodiment, communications via the first channel processing module 312 can be considered to be the primary communication channel for communications between the sensor 315 and the controller 40 and communications via the second channel processing module 312 can be considered to be the secondary communication channel for communications between the sensor 315 and the controller 40. However, the designation of the primary and secondary communication channels may be reversed (e.g., communication via the second channel processing module 312 may be considered to be the primary communication channel) in other embodiments. In alternate embodiment, the smart sensor node 310 may include a redundant sensor 315 that is connected to the channel selector 304 to provide a redundant sensor reading.

As shown in FIG. 8, the smart actuator node 320 can include an actuator 325 to control a corresponding portion of the physical system or process. The output response from the actuator 325 (indicating that an instruction was received and/or an action was taken) can be provided to one or more of the redundant channel processing modules 322 by a channel selector 304. The first channel processing module 322 and the second channel processing module 322 can use different IP addresses and/or different encryption keys when communicating with the controller 40 such that the channels are independent of one another. In addition, the channel processing modules 322 and the channel selector 304 also permit communications (e.g., instructions to take an action) from the controller 40 to be received by the actuator 325 via the channel selector 304. In one embodiment, communications via the first channel processing module 322 can be considered to be the primary communication channel for communications between the actuator 325 and the controller 40 and communications via the second channel processing module 322 can be considered to be the secondary communication channel for communications between the actuator 325 and the controller 40. However, the designation of the primary and secondary communication channels may be reversed (e.g., communication via the second channel processing module 322 may be considered to be the primary communication channel) in other embodiments.

FIG. 9 shows an embodiment of the channel selector 304. The channel selector 304 has a corresponding switch for each channel processing module in the node. Each switch in the channel selector 304 can be individually opened or closed to permit communications between the sensor or actuator of the node and the corresponding channel processing module. The channel selector 304 can receive instructions from the controller 40 (e.g., the controller process logic 174 and/or the detection and protection logic 270) as to the state (e.g., open or closed) of each of the switches in the channel selector 304.

Figure 10:
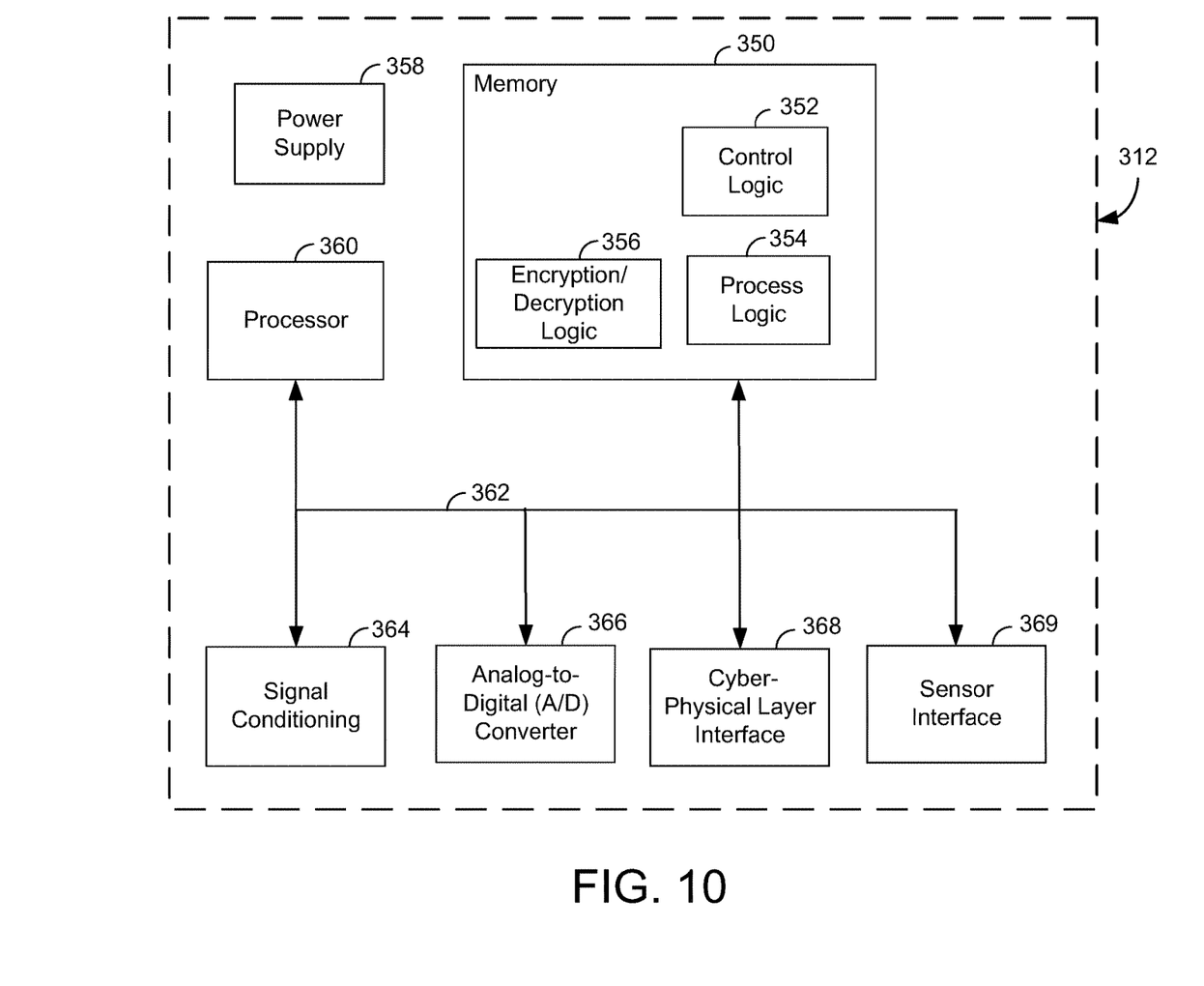
FIG. 10 is a block diagram of an embodiment of the channel processing module of FIG. 7.

FIG. 10 shows an embodiment of a channel processing module 312 for the smart sensor node 310. The channel processing module 312 shown by FIG. 10 can include logic 352, referred to herein as "control logic," for generally controlling the operation of the channel processing module 312. The channel processing module 312 also includes logic 354, referred to herein as "process logic," and logic 356, referred to herein as "encryption/decryption logic." The process logic 354 can be used for controlling the processing of the signals from the sensor with signal conditioning circuitry 364 and the conversion of the sensor signal to a digital signal with the analog-to-digital (A/D) converter 366. The encryption/decryption logic 356 can be used to encrypt or decrypt information and data passing through the channel processing module 312. In other embodiments, the process logic 354 and/or the encryption/decryption logic 356 can be combined with the control logic 352 or with one another. The control logic 352, the process logic 354, and the encryption/decryption logic 356 may be implemented in software, firmware, hardware, or any combination thereof. In FIG. 10, the control logic 352, the process logic 354 and the encryption/decryption logic 356 are implemented in software. The control logic 352, the process logic 354 and the encryption/decryption logic 356 may be stored in memory 350. However, other configurations of the control logic 352, the process logic 354 and the encryption/decryption logic 356 are possible in other embodiments.

Note that the control logic 352, the process logic 354 and encryption/decryption logic 356, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The channel processing module 312 may include at least one conventional processor 360, which includes processing hardware for executing instructions stored in the memory 350. As an example, the processor 360 may include a central processing unit (CPU) or a digital signal processor (DSP). The processor 360 communicates to and drives the other elements within the channel processing module 312 via a local interface 362, which can include at least one bus. When the control logic 352, the process logic 354 and the encryption/decryption logic 356 are implemented in software, the processor 360 may execute instructions of the control logic 352, the process logic 354 and encryption/decryption logic 356 to perform the functions ascribed herein to the control logic 352, the process logic 354 and encryption/decryption logic 356.

The channel processing module 312 can include a sensor interface 369 and a cyber-physical layer interface 368. While the sensor interface 369 and the cyber-physical layer interface 368 are shown as separate interfaces in FIG. 10, the interfaces may be combined into a single interface in other embodiments. The sensor interface 369 enables the channel processing module 312 to communicate with the sensor 315 via the channel selector 304. The cyber-physical layer interface 368 enables the channel processing module 312 to communicate with the controller 40 via the cyber-physical layer 37. The channel processing module 312 can also have a power supply 358, which provides electrical power to the components of the channel processing module 312 and possibly, in an embodiment, to sensor 315.

In an embodiment, the granularity or frequency of the channel processing module 312 communicating with the controller 40 can be adaptable to current conditions relating to the smart sensor node 310. For example, during "normal" operation, communication between the smart sensor node 310 and the controller 40 may occur less frequently, but if an attack or fault is detected, the attack detection and protection system 160 can request the smart sensor node 310 to send data at a higher granularity/frequency to permit the attack detection and protection system 160 to analyze the situation in the minimum possible time.

Figure 11:
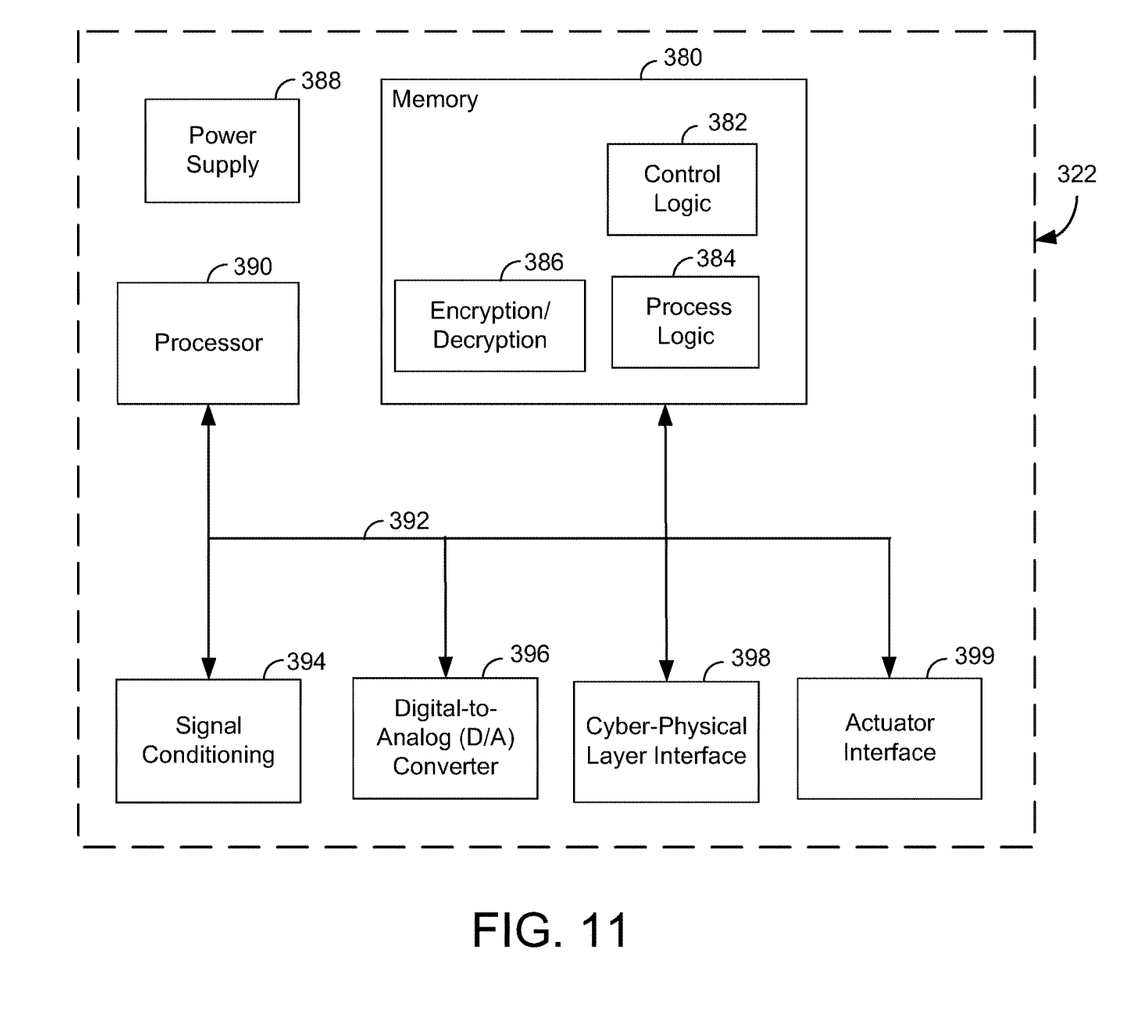
FIG. 11 is a block diagram of an embodiment of the channel processing module of FIG. 8.

FIG. 11 shows an embodiment of a channel processing module 322 for the smart actuator node 320. The channel processing module 322 shown by FIG. 11 can include logic 382, referred to herein as "control logic," for generally controlling the operation of the channel processing module 322. The channel processing module 322 also includes logic 384, referred to herein as "process logic," and logic 386, referred to herein as "encryption/decryption logic." The process logic 384 can be used for controlling the processing of the signals to or from the actuator with signal conditioning circuitry 394 and the conversion of the instruction from the controller 40 an analog signal for the actuator 325 with the digital-to-analog (D/A) converter 396. The encryption/decryption logic 386 can be used to encrypt or decrypt instructions and responses passing through the channel processing module 322.

In other embodiments, the process logic 384 and/or the encryption/decryption logic 386 can be combined with the control logic 382 or with one another. The control logic 382, the process logic 384, and the encryption/decryption logic 386 may be implemented in software, firmware, hardware, or any combination thereof. In FIG. 11, the control logic 382, the process logic 384 and the encryption/decryption logic 386 are implemented in software. The control logic 382, the process logic 384 and the encryption/decryption logic 386 may be stored in memory 380. However, other configurations of the control logic 382, the process logic 384 and the encryption/decryption logic 386 are possible in other embodiments.

Note that the control logic 382, the process logic 384 and encryption/decryption logic 386, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The channel processing module 322 may include at least one conventional processor 390, which includes processing hardware for executing instructions stored in the memory 380. As an example, the processor 390 may include a central processing unit (CPU) or a digital signal processor (DSP). The processor 390 communicates to and drives the other elements within the channel processing module 322 via a local interface 392, which can include at least one bus. When the control logic 382, the process logic 384 and the encryption/decryption logic 386 are implemented in software, the processor 390 may execute instructions of the control logic 382, the process logic 384 and encryption/decryption logic 386 to perform the functions ascribed herein to the control logic 382, the process logic 384 and encryption/decryption logic 386.

The channel processing module 322 can include a actuator interface 399 and a cyber-physical layer interface 398. While the actuator interface 399 and the cyber-physical layer interface 398 are shown as separate interfaces in FIG. 11, the interfaces may be combined into a single interface in other embodiments. The actuator interface 399 enables the channel processing module 322 to communicate with the actuator 325 via the channel selector 304. The cyber-physical layer interface 398 enables the channel processing module 322 to communicate with the controller 40 via the cyber-physical layer 37. The channel processing module 322 can also have a power supply 388, which provides electrical power to the components of the channel processing module 322 and possibly, in an embodiment, to actuator 325.

In an embodiment, the granularity or frequency of the channel processing module 322 communicating with the controller 40 can be adaptable to current conditions relating to the smart actuator node 320. For example, during "normal" operation, communication between the smart actuator node 320 and the controller 40 may occur less frequently, but if an attack or fault is detected, the attack detection and protection system 160 can request the smart actuator node 320 to send data at a higher granularity/frequency to permit the attack detection and protection system 160 to analyze the situation in the minimum possible time.

Figure 12:
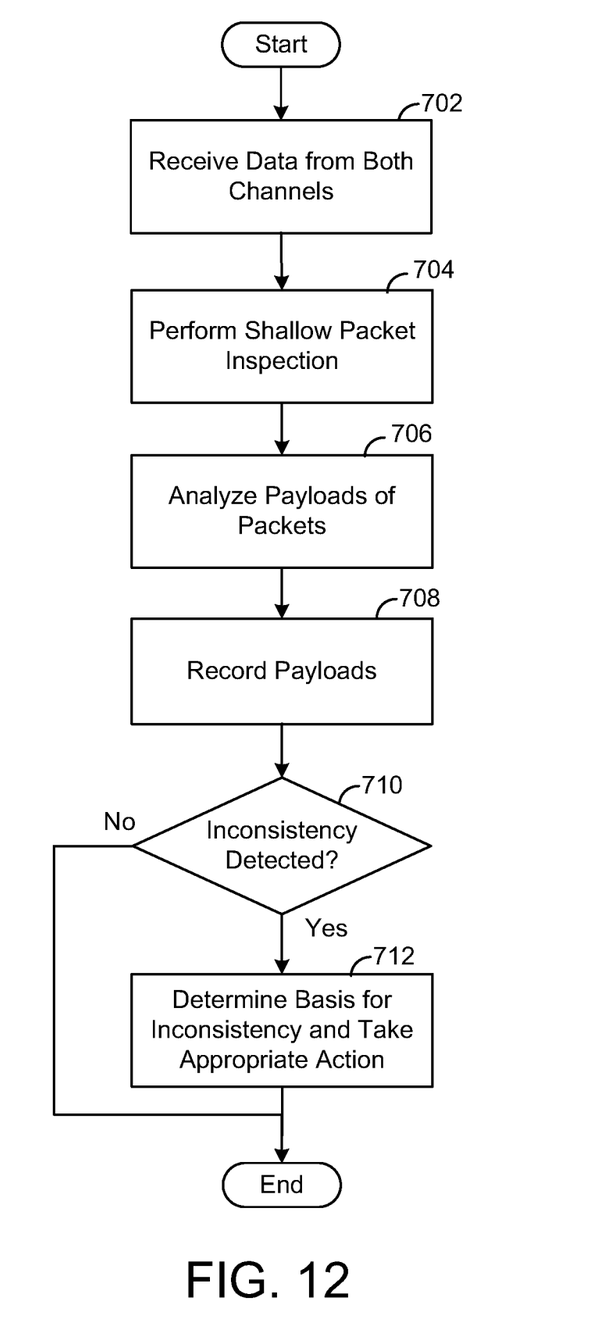
FIG. 12 is a flowchart showing an embodiment of a process for detecting an anomalous condition at a device of a control system.
Figure 13:
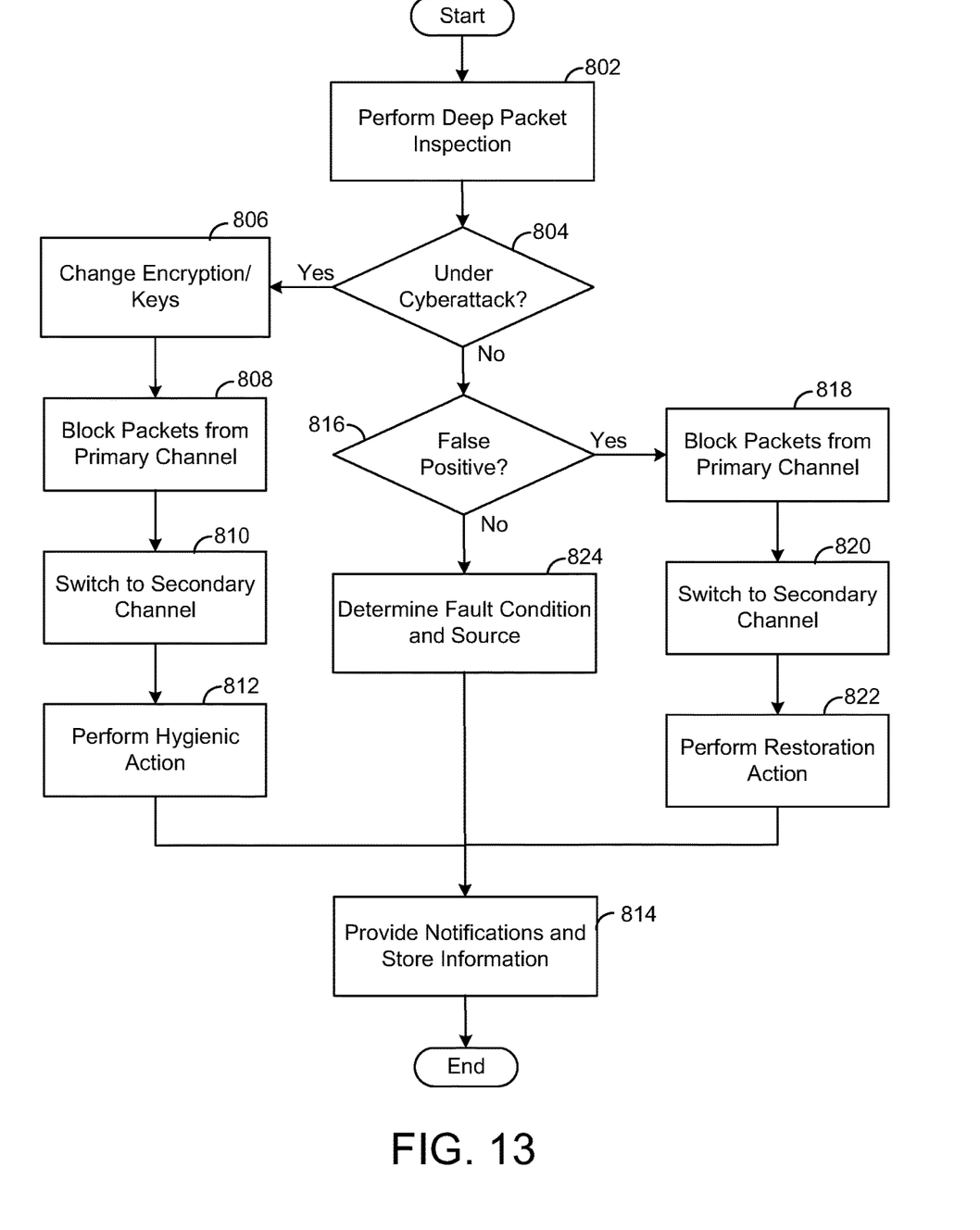
FIG. 13 is a flowchart showing an embodiment of a process for determining and remediating an anomalous condition at a device.

FIGS. 12 and 13 show flow charts for processing device data received at the attack detection and protection system 160. FIG. 12 shows an embodiment of a process implemented for detecting an anomalous condition (e.g., a cyberattack, false positive or fault condition) at a device 45 of the control system 30. FIG. 13 shows an embodiment of a process for determining and remediating the detected anomalous condition at the device 45 of the control system 30.

In FIG. 12, the process begins by the attack detection and protection system 160 receiving data from the primary and secondary communication channels from each device 45 (step 702). The attack detection and protection system 160 can receive data packets from each primary channel of the smart sensor nodes 310 and the smart actuator nodes 320 at the first channel interface 240 and can receive data packets from each secondary channel of the smart sensor nodes 310 and the smart actuator nodes 320 at the second channel interface 250. The attack detection and protection system 160 can then decrypt the data packets (if encrypted) with the encryption/decryption keys 261. The attack detection and protection system 160 then operates to determine if the primary channel of a sensor and the primary channel of the corresponding actuator are operating appropriately and not compromised (i.e., no anomalous conditions) as discussed below.

The attack detection and protection system 160 can perform a shallow packet inspection on each of the received packets (step 704). Specifically, the attack detection and protection system 160 can perform a shallow packet inspection on the datasets received from the sensor's primary and secondary channels and the actuator's primary and secondary channels. The shallow packet inspection performed by the attack detection and protection system 160 involves examining only packet headers, to validate the header information, and to extract essential payload values. The extracted payloads (or payload values) from each of the packets can then be analyzed by the attack detection and protection system 160 (step 706). The attack detection and protection system 160 can compare the corresponding payload values received on the primary and secondary channels for the sensor or actuator to analyze for any inconsistencies (e.g., a difference between sensor values outside of a predetermined tolerance range or greater than a predefined threshold value or a difference between the request sent to an actuator and the response received from the actuator or a response is not received from the actuator).

The payloads of the packets, whether or not there is an inconsistency, can then be recorded or stored in the encrypted data storage 266 by the attack detection and protection system 160 (step 708). In one embodiment the attack detection and protection system 160 can store the analyzed payload values with corresponding timestamp, geolocation coordinates, and altitude information. The attack detection and protection system 160 then makes a determination as to whether there is an inconsistency between the packets (step 710). If there is an inconsistency between the packets, the attack detection and protection system 160 can determine the basis for the inconsistency and take appropriate remediation actions (step 712). In one embodiment, the determination of the inconsistency and the implementation of the remediation action performed in step 712 can be the process shown in FIG. 13. However, other processes for determining inconsistencies and implementing remediation actions can be used in other embodiments. If no inconsistency between the packets is detected by the attack detection and protection system 160 (e.g., no inconsistency between values from the sensor's primary and secondary channels or inconsistencies between the request sent by the controller process logic 174 to the actuator and the responses received from the actuator's primary and secondary channels), then the process can end (step 712).

In FIG. 13, the process begins by performing a deep packet inspection on the packet received from the primary channel (step 802). The deep packet inspection can be used to determine if a sensor or actuator is under attack or providing "false positive" readings. For example, if a sensor is under attack, the sensor can send fake measurements that result in erroneous operation of the corresponding actuator or, if the actuator is under attack, the actuator can receive fake requests from the hacker believing the requests are coming from the controller 40, or the controller 40 may receive fake responses from the hacker believing the responses are coming from the actuator. The attack detection and protection system 160 can use the deep packet inspection to identify the fake packets described above that might be used in an attack.

The deep packet inspection can include a complete packet inspection of both the data streams coming from the sensor's or actuator's primary channel and secondary channel. The attack detection and protection system 160 can evaluate the payload and the header of each packet to discover any content that seems to be spams, viruses, intrusions, any non-compliance protocol, or any other suspicious pattern of data bits that happened to be included in the packet because the content was not detected or blocked by a first line of defense (e.g., firewalls) for the avionics system 20. To detect suspicious or "bad" content, the attack detection and protection system 160 can use signature database 262 and filters and protocols database 265. Thus, depending on what a packet contains, and based on the rules defined for signature detection, anomaly detection, and in some critical cases, through application reconstruction, the attack detection and protection system 160 can make real-time intelligent decisions about any active or passive attack.

Based on the deep packet inspection, the attack detection and protection system 160 determines whether the device 45 or the primary channel used by the device 45 is under a cyberattack (step 804). The attack detection and protection system 160 can use the deep packet inspection to determines if the sensor's or actuator's primary channel is under an attack such that the sensor is sending deceiving measurements or the actuator is sending deceiving responses to the controller, or the controller is not getting any packets from the actuator's primary channel because the hacker has launched a man-in-the-middle attack. If a cyberattack is occurring, the attack detection and protection system 160 proceeds to change encryption keys used by the primary channel (step 806). The attack detection and protection system 160 can intelligently instructs all the encryption/decryption processes in the controller 40 or the corresponding node for the sensor or actuator to change encryption keys. The attack detection and protection system 160 can then instruct the controller 40 to block the packets from the primary channel of the sensor or actuator from being received and processed by the controller process logic 174 (step 808) to stop the erroneous control of the actuator from false sensor readings or from false actuator responses. The attack detection and protection system 160 then changes or switches the "primary" channel for the controller process logic 174 to be the secondary channel for the device (step 810). The attack detection and protection system 160 can immediately select the sensor's or actuator's secondary channel to provide data or responses to the controller 40 or for the actuator to receive instructions from the controller 40. The attack detection and protection system 160 can place the sensor's or actuator's primary channel in isolation.

After switching the channel, the attack detection and protection system 160 can proceed to perform appropriate hygienic actions to remediate the cyberattack (step 812). The attack detection and protection system 160 can perform the necessary hygienic actions to disinfect the sensor or actuator or the primary channel of the sensor or actuator. The hygienic actions can include sending requests to the sensor's or actuator's channel processing module for the primary channel over the cyber-physical link 37 for resetting or rebooting the channel processing module, deleting the traces of malware, and allocating new IP address for the channel processing module to carry out future communications. After performing the hygienic actions, the attack detection and protection system 160 can provide the appropriate notifications and store the necessary information (step 814) and the process ends. For example, the attack detection and protection system 160 can notify the supervisory control system 32, notify the cockpit crew for the aircraft 11 for informational and situational awareness about the attack and the remedial action taken by the attack detection and protection system 160 in response to the attack and store data regarding the attack. The attack detection and protection system 160 can prepare a log of the attack and the actions taken, encrypt the data and save the data in the encrypted data storage 266 and can also save the log and related information in the library of past lessons learned 263.

If no cyberattack is detected in step 804, then the attack detection and protection system 160 proceeds to determine if a false positive reading or value was obtained (step 816). A false positive reading or value is a condition when a sensor's or actuator's channel sends false readings or responses even though there is no fault or failure of the sensor or actuator. Such operation of the sensor or actuator can be defined as non-optimal operation. In one embodiment, the root cause for non-optimal operation can be a poor choice of operating targets, poor feedstock quality, poor controller tuning, a rule's definition is missing some logic and/or is too broad, or there is some error in sensor calibration or in actuator calibration. As a result, the controller 40 can incorrectly identify an event to be a fault.

If a false positive reading has been detected, the attack detection and protection system 160 proceeds to instruct the controller 40 to block the packets from the primary channel of the sensor or actuator from being received and processed by the controller process logic 174 (step 818) to stop the erroneous control of the actuator from false sensor readings or from false actuator responses. The attack detection and protection system 160 then changes or switches the "primary" channel for the controller process logic 174 to be the secondary channel for the device (step 820). The attack detection and protection system 160 can immediately selects the sensor's or actuator's secondary channel to provide data or responses to the controller 40 or for the actuator to receive instructions from the controller. The attack detection and protection system 160 can place the sensor's or actuator's primary channel in isolation. After switching the channel, the attack detection and protection system 160 then proceeds to perform appropriate restorative actions to remediate the false positive indication (step 822). The restorative actions can include sending requests to the sensor's or actuator's channel processing module for the primary channel over the cyber-physical link 37 for resetting or rebooting the channel processing module.

After performing the restorative actions, the attack detection and protection system 160 can provided the appropriate notifications and store the necessary information (step 814) and the process ends. For example, the attack detection and protection system 160 can notify the supervisory control system 32, notify the cockpit crew for the aircraft for informational and situational awareness about the remedial action taken (if any) by the attack detection and protection system 160 and stores data regarding the attack. The attack detection and protection system 160 can prepare a log of the attack and the actions taken, encrypt the data and save the data in the encrypted data storage 266 and can also save the log and related information in the library of past lessons learned 263.

If no false positive is detected in step 816, then the attack detection and protection system 160 proceeds to determine that a fault condition is present and the source of the fault condition (step 824). As a result of deep packet inspection, if the attack detection and protection system 160 determines that the sensor or actuator or its associated circuitry is not under attack and that the sensor or actuator is not sending false positive readings, then the attack detection and protection system 160 concludes that there is an actual fault condition present at the sensor or actuator. The attack detection and protection system 160 can determine from the received data which component of the sensor or actuator is faulty or reporting the fault and possibly the reason why the fault occurred. After determining the source of the fault condition, the attack detection and protection system 160 can provide the appropriate notifications and store the necessary information (step 814) and the process ends. For example, the attack detection and protection system 160 can notify the supervisory control system 32, notify the cockpit crew for the aircraft for informational and situational awareness about the fault and the remedial action taken (if any) by the attack detection and protection system 160 and prepares a log of the fault and the actions taken (if any) and saves the information in the library of past lessons learned 263.

In an embodiment, depending on the nature of the attack, false positive or fault at a particular controller 40, the supervisory control system 32 can interact with other control entities (e.g., central controller 25, other controllers 40 and/or other supervisory control systems 32). In the case of attack detection, the supervisory control system 32 can inform all the other peer supervisory controls systems 32 so that they may alert their corresponding controllers 40 and attack detection and protection systems 160. In case of an actual fault, the attack detection and protection system 160 may notify (possibly via the supervisory control system 32) an automation management system of the avionics system 20 or the central controller 25 such that the necessary corrective actions can be taken. The supervisory control system 32 and/or the central controller 25 can 1) provide recommendations for the flight crew of the aircraft 11, in compliance with the automation management policy of the avionics system 20 specific to that aircraft 11, or 2) interpret mode indicators and instruments to facilitate the flight crew to communication the fault or attack precisely to the ground device 14 (e.g., a control tower), or 3) intervene according to the fault mitigation policy setup by the authorities. Depending on the severity/persistency of an attack/threat, or depending on the criticality of a fault, the supervisory control system 32 may inform the central controller 25 of the event. The central controller 25 may the send the report to the ground operations (i.e., ground device 14) depending on the situation, or severity of the attack, or intervene according to the attack or fault mitigation policy.

In an embodiment, the attack detection and protection system 160 may perform a deep packet inspection on received packets to streamline the flow of network traffic. For example, a message tagged as a high priority can be routed or scheduled to be routed to its destination ahead of less important or low-priority messages/packets. In addition, the attack detection and protection system 160 may determine fault conditions at the sensors or actuators (even if no inconsistency is detected) by comparing the values from the packets with corresponding thresholds from the threshold value database 264.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method of determining an anomalous condition in a distributed control system of an aircraft, the method comprising:

receiving, by a controller of a distributed control system, a first packet from a device via a first channel connecting the controller and the device, wherein the controller uses the first packet from the device for at least one of monitoring or controlling of the distributed control system and the device comprises one of a sensor or an actuator;

receiving, by the controller, a second packet from the device via a second channel connecting the controller and the device, wherein the second channel is separate from the first channel and wherein the first packet and the second packet are generated by separate processing devices in the device and are sent by the device in response to a single output from the one of the sensor or the actuator;

performing, by the controller, a first analysis of data in both the first packet and the second packet;

determining, by the controller, whether the data from the first packet and the second packet is inconsistent based on the first analysis;

performing, by the controller, a second analysis on the data in the first packet in response to a determination that the data from the first packet and the second packet is inconsistent;

determining, by the controller, an anomalous condition at the device based on the second analysis;

providing, by the controller, a notification to a user in response to the determination of an anomalous condition; and storing, by the controller, information regarding the first packet and the second packet in memory.

2. The method of claim 1, wherein storing information regarding the first packet and the second packet includes storing metadata with the information regarding the first packet and the second packet.

3. The method of claim 2, wherein the metadata includes a timestamp, a location of the aircraft and an altitude of the aircraft.

4. The method of claim 3, further comprises performing a forensic analysis using both the metadata and the information regarding the first packet and the second packet.

5. The method of claim 1, further comprises taking a remedial action in response to the determination of an anomalous condition, wherein taking remedial action includes preventing the controller from using the first packet from the device for the at least one of monitoring or controlling of the distributed control system.

6. The method of claim 5, wherein taking remedial action includes enabling the controller to use the second packet from the device for at least one of monitoring or controlling of the distributed control system.

7. The method of claim 5, wherein taking remedial action includes changing encryption keys used to communicate a first packet via the first channel.

8. The method of claim 1, wherein the determining an anomalous condition at the device includes determining one of a cyberattack, false positive or a fault condition.

9. The method of claim 1, wherein the determining an anomalous condition at the device includes comparing the data in the first packet with one or more of predetermined signatures or predetermined protocol formats to identify an anomalous condition.

10. The method of claim 1, wherein the determining an anomalous condition at the device includes using information about previous anomalous conditions to identify an anomalous condition in the data of the first packet.

11. A control system for a physical system of an aerospace vehicle, the control system comprising:

a controller, the controller comprising:
a first processor; and
a first memory device connected to the first processor, the first memory device storing control logic configured to monitor and control the physical system for the aerospace vehicle when executed by the first processor;

a plurality of device nodes connected to the controller, wherein each device node of the plurality of device nodes is connected to the controller by a first channel and a second channel separate from the first channel, wherein each device node of the plurality of device nodes comprising:

at least one device configured to interact with the physical system, the at least one device comprising at least one sensor or at least one actuator;
a first channel processing device connected between the at least one device and the first channel, the first channel processing device comprising a first interface to send and receive packets via the first channel regarding the at least one device; and
a second channel processing device connected between the at least one device and the second channel, the second channel processing device comprising a second interface to send and receive packets associated with the at least one device via the second channel;
an attack detection and protection system connected to the controller, the attack detection and protection system comprising:
a second processor;
a second memory device connected to the second processor, the second memory device storing detection and protection logic;
a first communication interface configured to send and receive packets with the plurality of device nodes via the first channel;
a second communication interface configured to send and receive packets with the plurality of device nodes via the second channel; and
the detection and protection logic, when executed by the second processor, being configured to perform operations including:
receive a first packet generated by the first channel processing device from a device node of the plurality of device nodes via the first communication interface and a second packet generated by the second channel processing device from the device node of the plurality of device nodes via the second communication interface in response to a single output from the at least one sensor or the at least one actuator;
perform a first analysis of data in both the first packet and the second packet;
determine whether the data from the first packet and the second packet is inconsistent based on the first analysis;
perform a second analysis on the data in the first packet in response to a determination that the data from the first packet and the second packet is inconsistent;
determine an anomalous condition associated with the device node based on the second analysis; and
store information regarding the first packet and the second packet in the second memory.

12. The control system of claim 11, wherein the controller comprises a third communication interface configured to send and receive first packets with the plurality of device nodes via the first channel, and the control logic, when executed by the first processor, is configured to use the packets received via the third communication interface to monitor and control the physical system for the aerospace vehicle.

13. The control system of claim 12, wherein the detection and protection logic, when executed by the second processor, being configured to perform operations including prevent the controller from receiving first packets from the device node of the plurality of device nodes via the third communication interface.

14. The control system of claim 13, wherein the detection and protection logic, when executed by the second processor, being configured to perform operations including enabling the controller to receive second packets from the device node of the plurality of device nodes via the third communication interface, wherein the control logic, when executed by the first processor, is configured to use the second packets received via the third communication interface to monitor and control the physical system for the aerospace vehicle.

15. The control system of claim 11, wherein the detection and protection logic, when executed by the second processor, being configured to perform operations including store metadata in the second memory with the information regarding the first packet and the second packet.

16. The control system of claim 15, wherein the metadata includes a timestamp, a location of the aerospace vehicle and an altitude of the aerospace vehicle.

17. The control system of claim 11, wherein the anomalous condition is one of a cyberattack, false positive or a fault condition.

18. The control system of claim 11, wherein the second memory comprises:
a threshold value database storing a plurality of threshold values related to the devices of the plurality of device nodes;
a signature database storing a plurality of signatures associated with anomalous conditions;
a library of past lessons learned storing logs of prior information regarding the plurality of device nodes; and
a filters and protocol database storing a plurality of protocol formats.

19. The control system of claim 18, wherein the detection and protection logic, when executed by the second processor, being configured to perform operations including compare the data in the first packet with the plurality of signatures in the signature database and the plurality of protocol formats in the filters and protocol database to determine an anomalous condition associated with the device node.

20. The control system of claim 18, wherein the detection and protection logic, when executed by the second processor, being configured to perform operations including determine an anomalous condition associated with the device node based on the logs of prior information in the library of past lessons.

21. The control system of claim 18, wherein the detection and protection logic, when executed by the second processor, being configured to perform operations including compare data in both the first packet and the second packet with respect to the plurality of threshold values in the threshold value database to determine the data from the first packet and the second packet is inconsistent.

22. The control system of claim 11, wherein the first channel processing device and the second channel processing device each comprises:
a third processor;
a third memory device connected to the third processor, the third memory device comprising encryption/decryption logic that when executed by the third processor encrypts packets for transmission and decrypts received packets;
signal conditioning circuitry to process signals to or from the at least one device; and
a converter to convert between analog signals and digital signals.

* * * * *